United States Patent
Montanari et al.

(10) Patent No.: US 11,059,258 B2
(45) Date of Patent: Jul. 13, 2021

(54) MULTILAYER COMBINING BOTH GOOD AGEING PROPERTIES AND RESISTANCE TO BURSTING IN HOT CONDITIONS, THAT CAN BE USED FOR HIGH-TEMPERATURE MOTOR VEHICLE APPLICATIONS

(71) Applicant: Arkema France, Colombes (FR)

(72) Inventors: Thibaut Montanari, Menneval (FR); Alexandre Vermogen, Soucieu en Jarrest (FR); Philippe Blondel, Bernay (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 16/753,353

(22) PCT Filed: Oct. 4, 2018

(86) PCT No.: PCT/FR2018/052447
§ 371 (c)(1),
(2) Date: Apr. 3, 2020

(87) PCT Pub. No.: WO2019/069028
PCT Pub. Date: Apr. 11, 2019

(65) Prior Publication Data
US 2020/0331229 A1    Oct. 22, 2020

(30) Foreign Application Priority Data
Oct. 5, 2017 (FR) ..................................... 1759323

(51) Int. Cl.
| B32B 1/08 | (2006.01) |
| B32B 7/12 | (2006.01) |
| B32B 27/08 | (2006.01) |
| B32B 27/22 | (2006.01) |
| B32B 27/30 | (2006.01) |
| B32B 27/34 | (2006.01) |
| F16L 11/04 | (2006.01) |

(52) U.S. Cl.
CPC .................. *B32B 1/08* (2013.01); *B32B 7/12* (2013.01); *B32B 27/08* (2013.01); *B32B 27/22* (2013.01); *B32B 27/306* (2013.01); *B32B 27/34* (2013.01); *F16L 11/04* (2013.01); *B32B 2250/24* (2013.01); *B32B 2250/40* (2013.01); *B32B 2307/306* (2013.01); *B32B 2307/308* (2013.01); *B32B 2307/546* (2013.01); *B32B 2307/558* (2013.01); *B32B 2307/704* (2013.01); *B32B 2307/7242* (2013.01); *B32B 2307/7244* (2013.01); *B32B 2307/7265* (2013.01); *B32B 2597/00* (2013.01); *B32B 2605/00* (2013.01); *Y10T 428/139* (2015.01); *Y10T 428/1352* (2015.01); *Y10T 428/1379* (2015.01); *Y10T 428/1383* (2015.01); *Y10T 428/1393* (2015.01)

(58) Field of Classification Search
CPC .. B32B 1/08; B32B 7/12; B32B 27/08; B32B 27/22; B32B 27/306; B32B 27/34; B32B 2307/7244; B32B 2307/306; B32B 2307/308; B32B 2307/546; B32B 2307/558; B32B 2307/704; B32B 2307/7242; B32B 2307/7265; B32B 2307/30; B32B 2307/552; B32B 2307/732; B32B 7/02; B32B 27/18; B32B 2250/24; B32B 2250/40; B32B 2597/00; B32B 2605/00; B32B 2270/00; F16L 11/04; Y10T 428/139; Y10T 428/1379; Y10T 428/1383; Y10T 428/1393; Y10T 428/1352
See application file for complete search history.

(56) References Cited

U.S. PATENT DOCUMENTS

| 8,748,004 B2 | 6/2014 | Briffaud et al. |
| 9,012,026 B2 | 4/2015 | Briffaud et al. |
| 9,346,988 B2 | 5/2016 | Ferreiro et al. |
| 9,365,744 B2 | 6/2016 | Briffaud et al. |
| 9,765,248 B2 | 9/2017 | Ferreiro et al. |
| 2010/0307625 A1* | 12/2010 | Martens .................. B32B 27/08 138/140 |
| 2010/0307626 A1 | 12/2010 | Martens et al. |
| 2018/0080583 A1 | 3/2018 | Montanari et al. |
| 2018/0099473 A1 | 4/2018 | Montanari et al. |

* cited by examiner

*Primary Examiner* — James C Yager
(74) *Attorney, Agent, or Firm* — Thomas F. Roland

(57) ABSTRACT

The present invention concerns a multilayer tubular structure (MLT) intended for transporting fluids such as air, oil, water, a urea solution, a cooling liquid made from glycol, a transmission oil cooler (TOC), or an air conditioning liquid, or a fuel such as petrol, in particular bio-petrol, or diesel, in particular bio-diesel, comprising at least one layer (1) and at least one layer (2), said layer (1) comprising a composition comprising: -a) at least 50% by weight of at least one semi-aromatic polyamide of formula W/ZT, -b) at least 10% by weight, preferably at least 15%, of an impact modifier, -c) between 0 and 20% by weight of at least once plasticiser, -d) between 0 and 40% by weight of at least one additive, the sum of a) +b) +c) +d) being equal to 100%, said layer (2) comprising a composition comprising a') at least 50% by weight of at least one short-chain semi-crystalline polyamide referred to as (A), said short-chain aliphatic polyamide (A) being of formula X Y/Z, or formula V/Z, -b') between 0 and 15% of at least one impact modifier, -c') between 0 and 12% by weight of at least once plasticiser, -d') between 0 and 40% by weight of at least one additive, the sum a')+b')+c')+d') being equal to 100%.

27 Claims, No Drawings

MULTILAYER COMBINING BOTH GOOD AGEING PROPERTIES AND RESISTANCE TO BURSTING IN HOT CONDITIONS, THAT CAN BE USED FOR HIGH-TEMPERATURE MOTOR VEHICLE APPLICATIONS

This application claims benefit, under U.S.C. § 119 or § 365 of PCT Application Number PCT/FR2018/052447, filed Oct. 4, 2018, and French Patent Applications Number FR 17.59323, filed Oct. 5, 2017, these documents being incorporated herein by reference.

The invention relates to a multi-layer structure, in particular in the form of a tube, and to the use thereof for transporting fluids such as air, oil, water, an air conditioning liquid or a fuel such as petrol or diesel, in particular for motor vehicles.

The invention relates more particularly to the tubes present inside an engine. These tubes can be intended, for example, for fuel transport, in particular between the tank and the engine, for the cooling circuit, for the hydraulic system, for the transmission oil cooler (TOC) or even intended for the air-conditioning circuit or the transport of a mixture of urea and water.

For fluid transport in transport vehicles many criteria need to be fulfilled, in particular good properties of flexibility, of cold impact resistance, of burst resistance notably in hot conditions, of aging resistance in hot conditions, of high enough melting point.

The temperatures for the automotive applications defined above are constantly increasing and this involves having an even higher melting point of the composition constituting the layers of the tube as well as, for the multi-layer tube, even higher resistance to aging and to bursting in hot conditions.

At the present time, there are two types of tubes, single-layer tubes and multi-layer tubes (MLT), i.e. those made up of one or more layers of polymer.

Conventionally, the multi-layer tubes used are manufactured by co-extrusion of various layers, according to standard techniques for thermoplastic transformation.

Compositions based on aliphatic polyamides (PA), in particular those with high carbon numbers (long chain), often have very good performance in aging resistance, but unfortunately the melting point is low (typically lower than about 200° C.).

Conversely, compositions based on semi-aromatic PAs, also referred to as polyphthalamides (PPA), which are typically copolymers with a unit derived from terephthalic acid, have this characteristic of a high melting point (typically higher than about 220° C.). They also have the advantage of being chemically more resistant, in hot conditions, to fluids such as alcohol-based bio-petrol or cooler. On the other hand, compared with long-chain aliphatic PAs (with units having a high carbon number, having an average number of carbon atoms per nitrogen atom ranging from 10 to 18) they are relatively non-ductile, relatively inefficient in terms of cold impact, not very flexible and relatively inefficient in terms of aging resistance.

Moreover, the tubes sought must avoid the following disadvantages:
if the tube is a multi-layer tube, the stripping of the layers, in particular internal layers, in particular during the insertion of the coupling (which might lead to leaks);
excessive inflation of the tube after aging in petrol (including bio-petrol) and diesel (including bio-diesel) systems, which may lead to leaks or problems of positioning under the vehicle.

Patent EP 2310438 describes A/XT copolyamides, in particular an 11/10T and tubes extruded using said composition.

Patent EP 2098580 describes tubes comprising at least two layers of polyamides, optionally plasticized, one being a layer formed by an adhesive composition, the other being an EVOH barrier layer or a polyamide layer having an average number of carbon atoms per nitrogen atom denoted $C_A$ of between 4 and 8.5, advantageously between 4 and 7, or at least three layers, one hardening layer formed by a composition comprising a polyamide denoted C having an average number of carbon atoms per nitrogen atom denoted $C_C$ of between 9 and 18, advantageously between 10 and 18.

International application WO 2017/121961 describes MLTs intended for transporting fuel, in particular petrol, notably alcohol-based petrol, comprising from the exterior towards the interior at least one barrier layer (1) and at least one interior layer (2) located below the barrier layer, the barrier layer (1) being a layer of EVOH or PPA, the interior layer (2) comprising predominantly at least one aliphatic polyamide and containing on average from 0 to 1.5% by weight of plasticiser relative to the total weight of the composition of layer (2).

International application WO 2017/121962 describes MLTs comprising from the interior towards the exterior at least one interior barrier layer (1) made of PPA and at least one exterior layer (2) located above the barrier layer containing on average from 0 to 5% of plasticiser relative to the total weight of the composition of layer (2) and comprising predominantly at least one aliphatic polyamide.

These two international applications thus aim to reduce the extraction of the plasticiser with alcohol-based petrols by the use of a very low proportion of plasticiser.

Even if certain semi-aromatic copolyamides have this double advantage of high melting point associated with good ductility and good aging resistance, the problem that remains to be solved is that nowadays and in the future, for high-temperature applications, it is increasingly necessary to have a third additional high-temperature characteristic, that of a high resistance to bursting pressure, which is missing in the polyphthalamides, in particular in their compositions that are sufficiently ductile, have good performance against cold impacts and aging (since the required properties are antagonistic and this leads to property compromises for single-layer polyphthalamide tubes).

Furthermore, the structures described in the patents or patent application above do not have the three high-temperature properties defined above.

The present invention aims to solve the problems defined above by an arrangement and a particular constitution of the layers of the multi-layer structure and in particular by semi-aromatic copolyamides combined with a particular category of highly crystalline polyamide, and in the form of a multi-layer structure, in particular of a multi-layer tube.

The present invention thus relates to a multilayer tubular structure (MLT) intended to transport fluids such as air, oil, water, urea solution, glycol-based cooling solution, transmission oil cooler (TOC), or an air-conditioning fluid or a fuel such as petrol, in particular bio-petrol or diesel, in particular bio-diesel, comprising at least one layer (1) and at least one layer (2), said layer (1) comprising a composition comprising:
a) at least 50% by weight of at least one semi-aromatic polyamide of formula W/ZT wherein:
W is a repeating aliphatic unit selected from a unit obtained from the polycondensation of at least one $C_4$-$C_{36}$ aminocarboxylic acid, a unit obtained from the polycondensation of at least one $C_4$-$C_{36}$ lactam, and an aliphatic repeating unit X.Y obtained from the polycondensation:
of at least one diamine X, said diamine being selected from a linear or branched aliphatic diamine or a mixture thereof, and
at least one dicarboxylic acid Y, said diacid being an aliphatic diacid,
said diamine and said diacid comprising from 4 to 36 carbon atoms, advantageously from 6 to 18 carbon atoms, notably from 9 to 18 carbon atoms,
the molar proportion of W being from 0.3 to 1.1 for 1 mole of ZT, preferably from 0.5 to 1 for 1 mole of ZT,
ZT is a repeating unit obtained from the polycondensation of at least one linear or branched aliphatic diamine (Z) comprising from 9 to 18 carbon atoms, advantageously from 10 to 15 carbon atoms, with terephthalic acid (T),
b) at least 10% by weight, preferably at least 15%, of an impact modifier,
c) from 0 to 20% by weight of at least one plasticiser,
d) from 0 to 40% by weight of at least one additive,
the sum a)+b)+c)+d) being equal to 100%,
said layer (2) comprising a composition comprising:
a') at least 50% by weight of at least one short-chain semi-crystalline polyamide denoted (A) constituted of at least 70% aliphatic units and having an average number of carbon atoms per nitrogen atom denoted $C_A$ ranging from 4 to 9.5, advantageously from 4 to 8, in particular from 4 to 7, said short-chain aliphatic polyamide (A) being:
of formula $X_1Y_1/Z_1$, wherein:
$X_1Y_1$ is a repeating aliphatic unit obtained from the polycondensation of at least one linear or branched aliphatic diamine $X_1$ comprising from 2 to 6 carbon atoms, advantageously from 4 to 6 carbon atoms, in particular comprising 6 carbon atoms with at least one aliphatic dicarboxylic acid $Y_1$ comprising from 2 to 12 carbon atoms, advantageously from 6 to 10 carbon atoms,
$Z_1$ is at least one optional polyamide repeating unit, $Z_1$ being able to be present at up to 30% by weight relative to the total weight $X_1Y_1/Z_1$, preferably up to 15% by weight relative to the total weight $X_1Y_1/Z_1$,
or
of formula $V/Z_1$, V being a repeating unit obtained from the polycondensation of at least one lactam comprising from 2 to 8 carbon atoms, advantageously from 4 to 6 carbon atoms, in particular 6 carbon atoms or at least one aminocarboxylic acid comprising from 2 to 8 carbon atoms, advantageously from 4 to 6 carbon atoms, in particular 6 carbon atoms, $Z_1$ being as defined above in a'),
b') from 0 to 15% of at least one impact modifier,
c') from 0 to 12% by weight of at least one plasticiser,
d') from 0 to 40% by weight of at least one additive,
the sum a')+b')+c')+d') being equal to 100%.

The Inventors have thus found that the combination of semi-aromatic copolyamides with specific semi-crystalline polyamides in the form of a multi-layer tubular structure had the advantage of having the three properties, namely a high melting point, a high aging resistance at high temperature as well as a high bursting pressure at high temperature.

Furthermore, the multi-layer tubular structures of the invention do not have the problems of HDT, creep, heat resistance of the coupling, thermoformability and bend radius encountered with the MLTs of the prior art.

The expression "short-chain semi-crystalline polyamide" designates a polyamide having an average number of carbon atoms per nitrogen atom ranging from 4 to 9.5, advantageously from 4 to 8, in particular from 4 to 7.

The term "fluid" refers to a gas used in a motor vehicle, in particular a gas such as air or a liquid, in particular a liquid and notably an oil, a brake fluid, a urea solution, a glycol-based cooling solution, a transmission oil cooler (TOC), or an air-conditioning fluid, or a fuel such as petrol, in particular bio-petrol or diesel, in particular bio-diesel.

Nitrogen and oxygen are excluded from the definition of said gas.

Advantageously, the fluid is selected from air, oil, a brake fluid, a urea solution, a glycol-based cooling solution, a transmission oil cooler (TOC), or an air-conditioning fluid, or a fuel such as petrol, in particular bio-petrol or diesel, in particular bio-diesel.

The nomenclature used to define the polyamides is described in ISO standard 1874-1:2011 "Plastics—Polyamide (PA) molding and extrusion materials—Part 1: Designation" and is well known to the person skilled in the art.

The term "polyamide" according to the invention refers equally to a homopolyamide or to a copolyamide.

Regarding Layer (1)

In a first variant of the invention, the repeating aliphatic unit W is obtained from the polycondensation of at least one $C_4$-$C_{36}$ aminocarboxylic acid.

Advantageously, said aminocarboxylic acid comprises from 9 to 12 carbon atoms. It can accordingly be chosen from 9-aminononanoic acid (denoted 9), 10-aminodecanoic acid (denoted 10), 11-aminoundecanoic acid (denoted 11) and 12-aminododecanoic acid (denoted 12); advantageously the aminocarboxylic acid is 11-aminoundecanoic acid.

In a second variant of the invention, the repeating aliphatic unit W is obtained from the polycondensation of at least one $C_4$-$C_{36}$ lactam.

Advantageously, the lactam comprises from 9 to 12 carbon atoms. It can accordingly be chosen from decanolactam (denoted 10), undecanolactam (denoted 11) and laurolactam or lauryllactam (denoted 12); advantageously, the lactam is lauryllactam.

However, it can absolutely be envisaged to use, for the production of this same unit W, a mixture of two or more aminocarboxylic acids, a mixture of two or more lactams, but also a mixture of one, two or more aminocarboxylic acids with one, two or more lactams.

In a more particularly preferred manner, the repeating unit W is obtained from a single aminocarboxylic acid or from a single lactam.

W: repeating unit X.Y

The repeating unit X.Y is a unit obtained from the polycondensation of at least one linear or branched aliphatic diamine X or a mixture thereof,
and at least one aliphatic dicarboxylic acid.

The molar proportions of diamine and dicarboxylic acid are preferably stoichiometric.

The aliphatic diamine used to produce this repeating unit X.Y is an aliphatic diamine that has a linear main chain comprising from 4 to 36 carbon atoms.

This linear main chain can, if necessary, include one or more methyl and/or ethyl substituent(s); in the latter configuration, this is called a "branched aliphatic diamine". In the case where the main chain does not include any substituent, the aliphatic diamine is called a "linear aliphatic diamine."

Whether or not it includes methyl and/or ethyl substituents on the main chain, the aliphatic diamine used to produce this repeating unit X.Y comprises from 4 to 36 carbon atoms, advantageously from 6 to 18 carbon atoms, notably from 9 to 18 carbon atoms.

When this diamine is a linear aliphatic diamine, it then corresponds to the formula $H_2N-(CH_2)x-NH_2$ and can be chosen for example from butanediamine, pentanediamine, hexanediamine, heptanediamine, octanediamine, nonanediamine, decanediamine, undecanediamine, dodecanediamine, tridecanediamine, tetradecanediamine, hexadecanediamine, octadecanediamine and octadecenediamine. The linear aliphatic diamines that have just been cited can all be bio-sourced in the sense of standard ASTM D6866.

When this diamine is a branched aliphatic diamine, it can in particular be 2-methyl-pentanediamine, 2-methyl-1,8-octanediamine or trimethylene (2,2,4 or 2,4,4) hexanediamine.

The dicarboxylic acid comprises from 4 to 36 carbon atoms, advantageously from 6 to 18 carbon atoms, notably from 9 to 18 carbon atoms.

The aliphatic dicarboxylic acid can be chosen from the linear or branched aliphatic dicarboxylic acids When the dicarboxylic acid is aliphatic and linear, it can be chosen from succinic acid (4), pentanedioic acid (5), adipic acid (6), heptanedioic acid (7), octanedioic acid (8), azelaic acid (9), sebacic acid (10), undecanedioic acid (11), dodecanedioic acid (12), brassylic acid (13), tetradecanedioic acid (14), hexadecanedioic acid (16), octadecanoic acid (18), octadecenedioic acid (18), eicosanedioic acid (20), docosanedioic acid (22) and fatty acid dimers containing 36 carbons.

The fatty acid dimers mentioned above are dimerized fatty acids obtained by oligomerization or polymerization of monobasic unsaturated long-chain hydrocarbon fatty acids (such as linoleic acid and oleic acid), as described in particular in document EP 0 471 566.

Advantageously, said layer (1) comprises a composition made up of at least 50% by weight of said at least one semi-aromatic polyamide.

Advantageously, said layer (1) comprises a composition made up of at least 60% by weight of said at least one semi-aromatic polyamide.

Advantageously, said layer (1) comprises a composition made up of at least 70% by weight of said at least one semi-aromatic polyamide.

Advantageously, said layer (1) comprises a composition made up of at least 80% by weight of a semi-aromatic polyamide.

Advantageously, said layer (1) comprises a composition made up of at least 90% by weight of a semi-aromatic polyamide.

Advantageously, said layer (1) comprises a composition made up of at least 60% by weight of a semi-aromatic polyamide.

Advantageously, said layer (1) comprises a composition made up of at least 70% by weight of a semi-aromatic polyamide.

Advantageously, said layer (1) comprises a composition made up of at least 80% by weight of a semi-aromatic polyamide.

Advantageously, said layer (1) comprises a composition made up of at least 90% by weight of a semi-aromatic polyamide.

It can also contain up to 10% of at least one other polyamide, notably an aliphatic polyamide.

The tubular structure can comprise several identical or different layers (1), in particular identical.

Regarding Layer (2)

Short-Chain Aliphatic Polyamide (A): $X_1Y_1/Z_1$

Layer (2) comprises a composition comprising at least 50% of at least one short-chain semi-crystalline polyamide denoted (A) made up of at least 70% of aliphatic units.

The expression "semi-crystalline polyamide" in the sense of the invention throughout the description refers to polyamides that have a melting temperature (Tf) and an enthalpy of fusion $\Delta H > 25$ J/g, in particular >40 J/g, notably >45 J/g, as well as a glass-transition temperature (Tg) as determined by DSC according to ISO standards 11357-1:2016 and 11357-2 and 3:2013 at a heating rate of 20 K/min. Throughout the description, the expression "made up of at least 70% aliphatic units" means that the short-chain polyamide (A) is predominantly aliphatic, i.e. that the unit $Z_1$ is made up of repeating units of non-aliphatic polyamide which can range up to 30% and make up the remainder to 100% by weight in the polyamide (A), in which case the short-chain polyamide (A) is made up of 70% or more of aliphatic units.

In the case where $Z_1$ is a repeating aliphatic polyamide unit making up the remainder to 100% by weight in the polyamide (A), the short-chain polyamide (A) is entirely aliphatic and is thus made up of 100% of aliphatic units.

There is an intermediate case in which $Z_1$ is made up of repeating aliphatic units and repeating non-aliphatic units making up the remainder to 100% by weight in the polyamide (A), and then the short-chain polyamide (A) is made up of more than 70% of aliphatic units.

Advantageously, said short-chain semi-crystalline polyamide denoted (A) is made up of at least 85% by weight of aliphatic units.

Advantageously, said composition comprises at least 60% by weight of at least one short-chain polyamide (A).

Advantageously, said composition comprises at least 70% by weight of at least one short-chain polyamide (A).

Advantageously, said composition comprises at least 80% by weight of at least one short-chain polyamide (A).

Advantageously, said composition comprises at least 90% by weight of at least one short-chain polyamide (A).

Advantageously, said composition comprises at least 60% by weight of one or two short-chain polyamides (A).

Advantageously, said composition comprises at least 70% by weight of one or two short-chain polyamides (A).

Advantageously, said composition comprises at least 80% by weight of one or two short-chain polyamides (A).

Advantageously, said composition comprises at least 90% by weight of one or two short-chain polyamides (A).

Advantageously, said composition comprises at least 60% by weight of one short-chain polyamide (A).

Advantageously, said composition comprises at least 70% by weight of one short-chain polyamide (A).

Advantageously, said composition comprises at least 80% by weight of one short-chain polyamide (A).

Advantageously, said composition comprises at least 90% by weight of one short-chain polyamide (A).

The expression "average number of carbon atoms per nitrogen atom" means that in the case of a $PA-X_1Y_1$ homopolyamide, the number of carbon atoms per nitrogen atom is the mean of unit $X_1$ and of unit $Y_1$.

Advantageously, the aliphatic units (A) have an average number of carbon atoms per nitrogen atom of 4 to 8.

Advantageously, the aliphatic units (A) have an average number of carbon atoms per nitrogen atom of 4 to 7.

In the case of copolyamides, the number of carbon atoms per nitrogen atom is calculated according to the same principle. The molar ratios of the various amide units are used for the calculation.

When the diamine $X_1$ is a linear aliphatic diamine, it can be selected for example from ethylenediamine, propylenediamine, butanediamine, pentanediamine, and hexanediamine.

When the diamine $X_1$ is a branched aliphatic diamine, it can in particular be 2-methylpentanediamine, 2-methyl-1,8-octanediamine or trimethylene-(2,2,4 or 2,4,4)hexanediamine.

The dicarboxylic acid can be chosen from the linear or branched aliphatic dicarboxylic acids.

When the dicarboxylic acid $Y_1$ is aliphatic and linear, it can be selected from oxalic acid (2), malonic acid (3), succinic acid (4), pentanedioic acid (5), adipic acid (6), heptanedioic acid (7), octanedioic acid (8), azelaic acid (9), sebacic acid (10), undecanedioic acid (11), dodecanedioic acid (12).

$Z_1$ Optional Polyamide Unit $Z_1$ is at least one repeating polyamide unit obtained from the polycondensation of at least one lactam, of at least one aminocarboxylic acid or of at least one repeating unit $X_2Y_2$ obtained from the polycondensation of at least one diamine $X_2$ and at least one dicarboxylic acid $Y_2$.

When $Z_1$ is obtained from the polycondensation of at least one lactam, said lactam is $C_2$-$C_{12}$, preferably $C_6$ or $C_9$-$C_{12}$, more preferably $C_6$, $C_9$ or $C_{10}$.

When $Z_1$ is obtained from the polycondensation of at least one aminocarboxylic acid, said aminocarboxylic acid is $C_2$-$C_{12}$, preferably $C_6$ or $C_9$-$C_{12}$, more preferably $C_6$, $C_9$ or $C_{10}$.

It is obvious that when $Z_1$ is for example $C_{12}$ (lactam or aminocarboxylic acid), the proportion of $Z_1$ in the short-chain aliphatic polyamide (A) is such that it respects the average number of carbon atoms per nitrogen atom denoted $C_A$ ranging from 4 to 9.5, advantageously from 4 to 8, in particular from 4 to 7.

Short-Chain Aliphatic Polyamide (A): $V/Z_1$

When V is obtained from the polycondensation of at least one lactam, said lactam is $C_2$-$C_8$, preferably $C_4$-$C_6$, notably $C_6$, i.e. caprolactam.

When V is obtained from the polycondensation of at least one aminocarboxylic acid, said aminocarboxylic acid is $C_2$-$C_8$, preferably $C_4$-$C_6$, notably $C_6$, i.e. aminohexanoic acid.

$Z_1$ is likewise an optional unit and is as defined for $X_1Y_1/Z_1$.

In one variant, $Z_1$ is present up to 30% by weight relative to the total weight of (A), regardless of the structure $X_1Y_1/Z_1$ or $V/Z_1$.

In another variant, $Z_1$ is present up to 15% by weight relative to the total weight of (A), regardless of the structure $X_1Y_1/Z_1$ or $V/Z_1$.

In yet another variant $Z_1$ is present up to 10% by weight, notably up to 5% by weight relative to the total weight of (A), regardless of the structure $X_1Y_1/Z_1$ or $V/Z_1$.

Advantageously, the proportion of $Z_1$ is equal to 0, whether in the structure $X_1Y_1/Z_1$ or in the structure $V/Z_1n$.

The tubular structure can comprise several identical or different layers (2), in particular different.

Regarding the Impact Modifier

The impact modifier advantageously consists of a polymer having a flexural modulus lower than 100 MPa measured according to standard ISO 178:2010, determined at 23° C. with a relative humidity of 50% RH and a Tg lower than 0° C. (measured according to standard 11357-2:2013 at the point of inflection of the DSC thermogram), in particular a polyolefin.

The polyolefin of the impact modifier can be functionalized or non-functionalized or be a mixture of at least one functionalized polyolefin and/or least one non-functionalized polyolefin. To simplify, the polyolefin is denoted (B) and functionalized polyolefins (B1) and non-functionalized polyolefins (B2) are described below.

A non-functionalized polyolefin (B2) is classically a homopolymer or copolymer of alpha-olefins or diolefins, such as for example, ethylene, propylene, 1-butene, 1-octene, butadiene. As examples, mention may be made of:
  the homopolymers and copolymers of polyethylene, particularly LDPE, HDPE, LLDPE (linear low-density polyethylene), VLDPE (very low density polyethylene) and metallocene polyethylene.
  homopolymers or copolymers of propylene.
  ethylene/alpha-olefin copolymers such as ethylene/propylene, EPRs (abbreviation for ethylene-propylene-rubber) and ethylene/propylene/diene (EPDM).
  styrene/ethylene-butene/styrene (SEBS), styrene/butadiene/styrene (SBS), styrene/isoprene/styrene (SIS), styrene/ethylene-propylene/styrene (SEPS) block copolymers.
  copolymers of ethylene with at least one product chosen from the salts or esters of unsaturated carboxylic acids such as alkyl (meth)acrylate (for example methyl acrylate), or the vinyl esters of saturated carboxylic acids such as vinyl acetate (EVA), where the proportion of comonomer can reach 40% by weight.

The functionalized polyolefin (B1) can be a polymer of alpha-olefins having reactive units (functionalities); such reactive units are acid, anhydride, or epoxy functions. As an example, mention may be made of the preceding polyolefins (B2) grafted or co- or ter-polymerized by unsaturated epoxides such as glycidyl (meth)acrylate, or by carboxylic acids or the corresponding salts or esters such as (meth)acrylic acid (which can be completely or partially neutralized by metals such as Zn, etc.) or by carboxylic acid anhydrides such as maleic anhydride. A functionalized polyolefin is for example a PE/EPR mixture, whose ratio by weight can vary widely, for example between 40/60 and 90/10, said mixture being co-grafted with an anhydride, in particular maleic anhydride, according to a graft rate for example of 0.01 to 5% by weight.

The functionalized polyolefin (B1) can be chosen from the following, maleic anhydride or glycidyl methacrylate grafted, (co)polymers wherein the graft rate is for example from 0.01 to 5% by weight:
  of PE, of PP, of copolymers of ethylene with propylene, butene, hexene, or octene containing for example from 35 to 80% by weight of ethylene;
  ethylene/alpha-olefin copolymers such as ethylene/propylene, EPRs (abbreviation for ethylene-propylene-rubber) and ethylene/propylene/diene (EPDM).
  styrene/ethylene-butene/styrene (SEBS), styrene/butadiene/styrene (SBS), styrene/isoprene/styrene (SIS), styrene/ethylene-propylene/styrene (SEPS) block copolymers.
  ethylene and vinyl acetate copolymers (EVA), containing up to 40% by weight of vinyl acetate;
  ethylene and alkyl (meth)acrylate copolymers, containing up to 40% by weight of alkyl (meth)acrylate;
  ethylene and vinyl acetate (EVA) and alkyl (meth)acrylate copolymers, containing up to 40% by weight of comonomers.

The functionalized polyolefin (B1) can also be chosen from ethylene/propylene copolymers with a majority of maleic anhydride grafted propylene condensed with a monoamine polyamide (or a polyamide oligomer) (products described in EP-A-0342066).

The functionalized polyolefin (B1) can also be a co- or terpolymer of at least the following units: (1) ethylene, (2) alkyl (meth)acrylate or vinyl ester of saturated carboxylic acid and (3) anhydride such as maleic anhydride or (meth) acrylic acid or epoxy such as glycidyl (meth)acrylate.

As an example of functionalized polyolefins of the latter type, mention may be made of the following copolymers, where ethylene represents preferably at least 60% by weight and where the termonomer (the function) represents for example from 0.1 to 10% by weight of the copolymer:
  ethylene/alkyl (meth)acrylate/(meth)acrylic acid or maleic anhydride or glycidyl methacrylate copolymers;
  ethylene/vinyl acetate/maleic anhydride or glycidyl methacrylate copolymers;
  ethylene/vinyl acetate or alkyl (meth)acrylate/(meth) acrylic acid or maleic anhydride or glycidyl methacrylate copolymers.

In the preceding copolymers, (meth)acrylic acid can be salified with Zn or Li.

The term "alkyl (meth)acrylate" in (B1) or (B2) denotes C1 to C8 alkyl methacrylates and acrylates, and can be chosen from methyl acrylate, ethyl acrylate, n-butyl acrylate, isobutyl acrylate, 2-ethyl-hexyl acrylate, cyclohexyl acrylate, methyl methacrylate and ethyl methacrylate.

Moreover, the previously cited polyolefins (B1) may also be crosslinked by any appropriate method or agent (diepoxy, diacid, peroxide, etc.); the term functionalized polyolefin also comprises mixtures of the previously cited polyolefins with a difunctional reagent such as a diacid, dianhydride, diepoxy, etc. that can react with these or mixtures of at least two functionalized polyolefins that can react together.

The copolymers mentioned above, (B1) and (B2), may be copolymerized in a statistical or sequenced way and have a linear or branched structure.

The molecular weight, MFI, and density of these polyolefins can also vary widely, which the person skilled in the art will know. MFI, abbreviation for Melt Flow Index, is a measure of fluidity when melted. It is measured according to standard ASTM 1238.

Advantageously the non-functionalized polyolefins (B2) are chosen from homopolymers or copolymers of polypropylene and any ethylene homopolymer or ethylene copolymer and a higher alpha-olefin comonomer such as butene, hexene, octene or 4-methyl-1-pentene. Mention may be made for example of PP, high-density PE, medium-density PE, linear low-density PE, low-density PE, very low-density PE. These polyethylenes are known by the person skilled in the art as being products from a "free-radical" method, from a "Ziegler" catalysis method, or, more recently, from "metallocene" catalysis.

Advantageously, the functionalized polyolefins (B1) are chosen from any polymer comprising alpha-olefin units and units bearing polar reactive functions such as epoxy, carboxylic acid or carboxylic acid anhydride functions. As examples of such polymers, mention may be made of terpolymers of ethylene, alkyl acrylate and maleic anhydride or glycidyl methacrylate like Lotader® from the Applicant or polyolefins grafted by maleic anhydride like Orevac® from the Applicant and terpolymers of ethylene, alkyl acrylate and (meth)acrylic acid. Mention may also be made of homopolymers or copolymers of polypropylene grafted by a carboxylic acid anhydride then condensed with polyamides or monoamine polyamide oligomers.

Regarding the Plasticiser:

As an example, the plasticisers are chosen from benzene sulfonamide derivatives, such as n-butylbenzenesulfonamide (BBSA); ethyl toluenesulfonamide or N-cyclohexyl toluenesulfonamide; hydroxybenzoic acid esters, such as 2-ethylhexyl parahydroxybenzoate and 2-decylhexyl parahydroxybenzoate; esters or ethers of tetrahydrofurfuryl alcohol, such as oligoethyleneoxytetrahydrofurfuryl alcohol; and esters of citric acid or of hydroxymalonic acid, such as oligoethyleneoxy malonate.

Using a mixture of plasticisers would not be outside the scope of the invention.

Regarding the Additive:

The additives optionally used in the compositions of the invention are the conventional additives used in polyamides and are well known to a person skilled in the art and are described notably in EP 2098580.

For example, they comprise an anti-static filler selected from carbon black, graphite, carbon fibers, carbon nanotubes, in particular carbon black and carbon nanotubes, an antioxidant, a heat stabilizer, a UV absorber, a light stabilizer, a lubricant, an inorganic filler, a fire-proofing agent, a nucleating agent and a dye, reinforcing fibers, a wax and the mixtures thereof.

As an example, the stabilizer can be a UV stabilizer, an organic stabilizer or more generally a combination of organic stabilizers, such as a phenol antioxidant (for example of the type Irganox® 245 or 1098 or 1010 by Ciba-BASF), a phosphite antioxidant (for example Irgafos® 126 and lrgafos® 168 by Ciba-BASF) and optionally other stabilizers such as a HALS, which means Hindered Amine Light Stabilizer (for example Tinuvin® 770 by Ciba-BASF), an anti-UV (for example Tinuvin® 312 by Ciba), or a phosphorus-based stabilizer. Amine antioxidants such as Crompton's Naugard® 445 or polyfunctional stabilizers such as Clariant's Nylostab® S-EED can also be used.

This stabilizer may also be a mineral stabilizer, such as a copper-based stabilizer. As an example of such mineral stabilizers, mention may be made of halides and copper acetates. Secondarily, other metals such as silver can optionally be considered, but these are known to be less effective. These compounds containing copper are typically associated with alkali metal halides, particularly potassium.

Regarding layer (1), the impact modifier and the plasticiser, in a first variant, the proportion of impact modifier in the composition of said layer (1) is at least 10% by weight relative to the total weight of the composition.

In a second variant, the proportion of impact modifier in the composition of said layer (1) is at least 15% by weight relative to the total weight of the composition.

In a third variant, said layer (1) is free of plasticiser.

In a fourth variant, the proportion of impact modifier in the composition of said layer (1) is at least 10% by weight relative to the total weight of the composition and said layer (1) is free of plasticiser.

In a fifth variant, the proportion of impact modifier in the composition of said layer (1) is at least 15% by weight relative to the total weight of the composition and said layer (1) is free of plasticiser.

Regarding layer (2), the impact modifier and the plasticiser, in a first variant, the proportion of impact modifier in the composition of said layer (2) is ≤12% by weight relative to the total weight of the composition.

In a second variant, the proportion of plasticiser in the composition of said layer (2) is from 0 to 15% relative to the total weight of the composition.

In a third variant, said layer (2) is free of plasticiser.

In a fourth variant, the proportion of impact modifier in the composition of said layer (2) is ≤12% by weight relative to the total weight of the composition and the proportion of plasticiser in the composition of said layer (2) is from 0 to 15% relative to the total weight of the composition.

In a fifth variant, the proportion of impact modifier in the composition of said layer (2) is ≤12% by weight relative to the total weight of the composition and said layer (2) is free of plasticiser.

Regarding layer (1) and layer (2) and the impact modifier as well as the plasticiser, in a first variant, the proportion of impact modifier in the composition of said layer (1) is at least 10% by weight relative to the total weight of the composition and the proportion of impact modifier in the composition of said layer (2) is ≤12% by weight relative to the total weight of the composition.

In a second variant, the proportion of impact modifier in the composition of said layer (1) is at least 15% by weight relative to the total weight of the composition and the proportion of impact modifier in the composition of said layer (2) is ≤12% by weight relative to the total weight of the composition. Advantageously, the proportion of impact modifier b) of layer (1) is greater than or equal to 1.5 times the proportion of impact modifier b') of layer (2).

In a third variant, said layer (1) is free of plasticiser and the proportion of plasticiser in said layer (2) is from 0 to 20% by weight relative to the total weight of the composition.

In a fourth variant, the proportion of plasticiser in said layer (1) is from 0 to 20% by weight relative to the total weight of the composition and said (2) is free of plasticiser.

In a fifth variant, said layer (1) and said (2) are free of plasticiser.

In a sixth variant, the proportion of impact modifier in the composition of said layer (1) is at least 10% by weight relative to the total weight of the composition and the proportion of impact modifier in the composition of said layer (2) is ≤12% by weight relative to the total weight of the composition, said layer (1) is free of plasticiser and the proportion of plasticiser in said layer (2) is from 0 to 20% by weight relative to the total weight of the composition.

In a seventh variant, the proportion of impact modifier in the composition of said layer (1) is at least 10% by weight relative to the total weight of the composition and the proportion of impact modifier in the composition of said layer (2) is ≤12% by weight relative to the total weight of the composition, the proportion of plasticiser in said layer (1) is from 0 to 20% by weight relative to the total weight of the composition and said (2) is free of plasticiser.

In an eighth variant, the proportion of impact modifier in the composition of said layer (1) is at least 10% by weight relative to the total weight of the composition and the proportion of impact modifier in the composition of said layer (2) is ≤12% by weight relative to the total weight of the composition, said layer (1) and said (2) are free of plasticiser.

In a ninth variant, the proportion of impact modifier in the composition of said layer (1) is at least 15% by weight relative to the total weight of the composition and the proportion of impact modifier in the composition of said layer (2) is ≤12% by weight relative to the total weight of the composition, said layer (1) is free of plasticiser and the proportion of plasticiser in said layer (2) is from 0 to 20% by weight relative to the total weight of the composition.

In a tenth variant, the proportion of impact modifier in the composition of said layer (1) is at least 15% by weight relative to the total weight of the composition and the proportion of impact modifier in the composition of said layer (2) is ≤12% by weight relative to the total weight of the composition, the proportion of plasticiser in said layer (1) is from 0 to 20% by weight relative to the total weight of the composition and said (2) is free of plasticiser.

In an eleventh variant, the proportion of impact modifier in the composition of said layer (1) is at least 10% by weight relative to the total weight of the composition and the proportion of impact modifier in the composition of said layer (2) is ≤12% by weight relative to the total weight of the composition, said layer (1) and said (2) are free of plasticiser.

In one embodiment, the semi-aromatic polyamide of layer (1) of the multi-layer tubular structure (MLT), defined above, has a Tm of from 230° C. to 285° C., notably from 240° C. to 275° C., measured according to ISO standard 11357-3:2013.

Advantageously, the semi-aromatic polyamide of layer (1) of the multilayer tubular structure (MLT), defined above, is selected from PA 11/10T, PA 12/10T, PA 1010/10T, PA 1012/10T, PA 1212/10T, PA 610/10T, PA 612/10T, PA 11/12T, PA 12/12T, PA 1010/12T, PA 1012/12T, PA 1212/12T, PA 610/12T, PA612/12T.

In another embodiment, the short-chain semi-crystalline aliphatic polyamide of layer (2) of the multi-layer tubular structure (MLT), defined above, has a Tm ≥200° C.

Advantageously, the short-chain semi-crystalline aliphatic polyamide of layer (2) of the multi-layer tubular structure (MLT), defined above, has a crystallization enthalpy ≥25 J/g, preferably ≥40 J/g, in particular ≥45 J/g measured according to ISO standard 11357-3:2013.

Advantageously, the short-chain semi-crystalline aliphatic polyamide of layer (2) of the multilayer tubular structure (MLT), defined above, is selected from PA 610, PA 66, PA 6, PA 46, PA 510, PA 410, PA 612, PA 66/6 and PA 6/12 with less than 20% of co-monomer 6T, 6I, 6 and 12, respectively.

It would not be outside the scope of the invention for the polyamide of layer (2) to be PA 612/6T, PA 66/6T or PA 66/6I with less than 20% of co-monomers 6T or 6I.

Advantageously, the short-chain semi-crystalline aliphatic polyamide of layer (2) of the multilayer tubular structure (MLT), defined above, comprises at least one PA6, PA66 or PA6/66 or a mixture thereof and at least one PA 6Y, Y being an aliphatic dicarboxylic acid comprising from 9 to 14 carbon atoms, the mean of the average number of carbon atoms per nitrogen atom being from 4 to 9.5, notably from 4 to 8, in particular from 4 to 7.

In one variant, the semi-aromatic polyamide of layer (1) of the multi-layer tubular structure (MLT), defined above, has a Tm of from 230° C. to 285° C., notably from 240° C. to 275° C., measured according to ISO standard 11357-3:2013, and the short-chain semi-crystalline aliphatic polyamide of layer (2) has a Tm ≥200° C.

Advantageously, the semi-aromatic polyamide of layer (1) of the multi-layer tubular structure (MLT), defined above, has a Tm of from 240° C. to 275° C., measured according to ISO standard 11357-3:2013 and the short-chain semi-crystalline aliphatic polyamide of layer (2) has a Tm ≥200° C.

Advantageously, the semi-aromatic polyamide of layer (1) of the multi-layer tubular structure (MLT), defined above, is selected from PA 11/10T, PA 12/10T, PA 1010/10T, PA 1012/10T, PA 1212/10T, PA 610/10T, PA11/12.T, PA12/12.T, PA6.12/12T, PA12012/12T or PA612/10T, PA11/12T, PA12/12.T, PA6.12/12T, PA12012/12T in particular PA 11/10T, PA 12/10T, PA 1010/10T, PA 1212/10T, or PA 612/10T and the short-chain semi-crystalline aliphatic polyamide of layer (2) is selected from PA610, PA 66, PA 6, PA 46, PA 510, PA 410, PA 612, PA 66/6 and PA 6/12 with less than 20% of co-monomer 6 and 12, respectively.

More advantageously, the semi-aromatic polyamide of layer (1) of the multilayer tubular structure (MLT), defined above, is selected from PA 11/10T, PA 12/10T, PA 1010/10T, PA 1212/10T, or PA 612/10T, and the short-chain semi-crystalline aliphatic polyamide of layer (2) is selected from PA610, PA 66, PA 6, PA 46, PA 510, PA 410, PA 612, PA 66/6 and PA 6/12 with less than 20% of co-monomer 6 and 12, respectively.

Layer or layers (2) of the multi-layer tubular structure (MLT) can have a thickness greater than or equal to twice the thickness of layer or layers (1).

When several layers (2) are present, they are or are not adjacent to one another.

In the same way, when several layers (1) are present, they are or are not adjacent to one another, and notably separated by one or more layer(s) (2).

When several layers (2) are present, even if the layers (2) are not adjacent to one another, the thickness of the layers (2) is the sum of the thickness of each layer (2). In the same way, when several layers (1) are present, even if the layers (1) are not adjacent to one another, the thickness of the layers (1) is the sum of the thickness of each layer (1).

In one embodiment, the multi-layer tubular structure (MLT), defined above, comprises from the exterior to the interior at least one layer (1) and at least one layer (2).

Layers (1) and (2) may or may not be adjacent.

When a single layer (1) and a single layer (2) are present, layer (2) is thus in contact with the fluid.

When layers (1) and (2) are not adjacent, a layer of binder may be present between layer (1) and layer (2).

At the least, the structure comprising a layer of binder is thus as follows (structure (I)):

Layer (1)//binder//layer (2)    (I)

The binder is notably described in patents EP 1452307 and EP1162061, EP 1216826 and EP0428833.

Other layers (1) and (2) can be present in the structure (I) but they will obviously be above layer (1) or below layer (2).

Advantageously, layer (1) and layer (2) are directly in contact with one another.

The two layers are thus adjacent and adhere to one another without another layer between the two.

At the least, the structures having a layer (1) and a layer (2) directly in contact with one another are thus as follows (structures (II) and (III)):

Layer (1)//layer (2)    (II)

Layer (2)//layer (1)    (III)

Advantageously, layer (1) is the outer layer and layer (2) is the inner layer.

Advantageously, layer (1) is the outer layer and layer (2) is the inner layer and layer (2) is the layer in contact with the fluid.

When layers (1) and (2) are adjacent, a layer (1') can be present below layer (2), layer (1') being such as defined for layer (1).

At the least, the structure is thus as follows (structures (IV)):

Layer (1)//layer (2)//layer (1')    (IV).

It is obvious that other layers (1) and/or (2), or others, may be present with the condition that three layers (1)//(2)//(1') are adjacent.

Advantageously, in the multi-layer tubular structure (MLT) (IV), layer (1') and layer (1) are identical.

In one embodiment, said composition of said layer (2) also comprises, in addition to said short-chain aliphatic polyamide (A), at least one aliphatic polyamide selected from:
one polyamide denoted A and an average number of carbon atoms per nitrogen atom denoted $C_A$ ranging from 4 to 9.5, advantageously from 4 to 8, in particular from 4 to 7,
one polyamide denoted B and an average number of carbon atoms per nitrogen atom denoted $C_B$ of from 7 to 10, advantageously from 7.5 to 9.5 or
one polyamide denoted C having an average number of carbon atoms per nitrogen atom denoted $C_C$ of between 9 to 18, advantageously from 10 to 18;
on condition that when said interior layer (2) comprises at least three polyamides, at least one of said polyamides B or C is excluded.

Said polyamide denoted A can be of the same type as the short-chain semi-crystalline aliphatic polyamide (A) but in any case it is different from the latter. In particular, the polyamide denoted A is an aliphatic polyamide.

Advantageously, the short-chain semi-crystalline aliphatic polyamide (A) of layer (2) is in proportion by weight greater than 70%, preferably greater than 80%, relative to the sum of the polyamides present in the composition of layer (2).

In another embodiment, said composition of said layer (2) comprises predominantly:
at least said short-chain semi-crystalline aliphatic polyamide denoted (A) constituted by at least 70% of aliphatic units having an average number of carbon atoms per nitrogen atom denoted $C_A$ ranging from 4 to 8.5, advantageously from 4 to 7, and the remainder to 100% of aliphatic units constituted of at least one unit denoted B having an average number of carbon atoms per nitrogen atom denoted $C_B$ ranging from 7 to 10, advantageously from 7.5 to 9.5 and of at least one unit denoted C having an average number of carbon atoms per nitrogen atom denoted $C_C$ ranging from 9 to 18, advantageously from 10 to 18;
the average number of carbon atoms per nitrogen atom in units A, B and C further satisfying the following strict inequation: $C_A<C_B<C_C$, and the mean of the average number of carbon atoms per nitrogen atom in units A, B and C being 4 to 8.5, advantageously from 4 to 7,
the enthalpy of fusion of the short-chain polyamide or the mass-weighted average of the enthalpies of fusion of the mixture of short-chain semi-crystalline aliphatic polyamides within said composition being greater than 25 J/g (DSC),
the melting temperature of the polyamide or of each of the polyamides being greater than or equal to 200° C.

In yet another embodiment, said composition of said layer (2) comprises predominantly:
at least said short-chain semi-crystalline aliphatic polyamide denoted (A) constituted by at least 70% of aliphatic units having an average number of carbon atoms per nitrogen atom denoted $C_A$ ranging from 4 to 8.5, advantageously from 4 to 7, and the remainder to 100% of aliphatic units constituted of at least one unit denoted B having an average number of carbon atoms per nitrogen atom denoted $C_B$ ranging from 7 to 10, advantageously from 7.5 to 9.5 and
at least said short-chain semi-crystalline aliphatic polyamide denoted (A) constituted by at least 70% of aliphatic units having an average number of carbon atoms per nitrogen atom denoted $C_A$ ranging from 4 to 8.5, advantageously from 4 to 7, and the remainder to 100% of aliphatic units constituted of at least one unit denoted C having an average number of carbon atoms per nitrogen atom denoted $C_C$ ranging from 9 to 18, advantageously from 10 to 18, the average number of carbon atoms per nitrogen atom in units A, B and C further satisfying the following strict inequation: $C_A<C_B<C_C$, and the mean of the average number of carbon atoms per nitrogen atom in units A, B and C being 4 to 8.5, advantageously from 4 to 7, the enthalpy of fusion of the short-chain polyamide or the mass-weighted average of the enthalpies of fusion of the mixture of short-chain semi-crystalline aliphatic polyamides within said composition being greater than 25 J/g (DSC), the melting temperature of the polyamide or of each of the polyamides being greater than or equal to 200° C.

Advantageously, in either one of these last two embodiments, said aliphatic unit represents from 80% to 97% by weight relative to the sum of the units present in the polyamides of the composition of layer (2).

In one embodiment, the multi-layer tubular structure (MLT), defined above also comprises a barrier layer chosen from a copolymer of ethylene and vinyl alcohol (EVOH) and PPA.

The expression "barrier layer" means that the layer is highly impermeable to the fluids transported.

In one embodiment, said barrier layer is EVOH.

In this case, it cannot be the outermost or the innermost layer.

Advantageously, said multi-layer tubular structure (MLT), defined above, comprises from the exterior to the interior (structure (V)):

layer (1)//layer (2)//EVOH//layer (2')//layer (1')     (V), layer (1') being as defined for layer (1), layer (2') being as defined for layer (2).

In a first variant, layer (1') and layer (1) are identical and layer (2') and layer (2) are identical:

layer (1)//layer (2)//EVOH//layer (2)//layer (1)     (VI).

In a second variant, layer (1') and layer (1) are identical and layer (2') and layer (2) are different:

layer (1)//layer (2)//EVOH//layer (2')//layer (1)     (VII).

In a third variant, layer (1') and layer (1) are different and layer (2') and layer (2) are identical:

layer (1)//layer (2)//EVOH//layer (2)//layer (1')     (VIII).

In a fourth variant, layer (1') and layer (1) are different and layer (2') and layer (2) are different:

layer (1)//layer (2)//EVOH//layer (2')//layer (1')     (IX).

In another embodiment, said barrier layer is made of a semi-aromatic polyamide (PPA).

Said semi-aromatic polyamide of the barrier layer is notably a semi-aromatic polyamide of formula X/YAr, as described in EP1505099, notably a semi-aromatic polyamide of formula D/XT, wherein D is selected from a unit obtained from an amino acid, a unit obtained from a lactam, and a unit corresponding to the formula (Ca diamine).(Cb diacid), with a representing the number of carbon atoms of the diamine and b representing the number of carbon atoms of the diacid, a and b each being between 4 and 36, advantageously between 9 and 18;

X.T denotes a unit obtained from the polycondensation of a Cx diamine and terephthalic acid, with x representing the number of carbon atoms of the Cx diamine, x being between 6 and 36, advantageously between 9 and 18, notably a polyamide of formula D/6T, D/9T, D/10T or D/11T, D being as defined above, in particular a polyamide PA 6/6T, 66/6T, 6I/6T, PA11/10T, 11/6T/10T, MXDT/10T or MPMDT/10T, BACT/10T aramide, and the block copolymers, in particular polyamide/polyether (PEBA) or a polyamide of formula MXDY or PXDY wherein Y is a dicarboxylic acid as defined above.

Advantageously, the semi-aromatic polyamide is selected from a polyamide MXD6, PXD6, MXD10, PXD10, or a copolyamide $X_2T/X'_2Ar$, $X_2$ and $X'_2$ each representing, independently of each other, a linear or branched $C_6$-$C_{13}$ aliphatic diamine, notably, the semi-aromatic polyamide is selected from PA9T, PA9T/9'T, PA10T/6T, PA6T/6I, PA6T/66.

9' corresponds to the nonanediamine positional isomer methyloctanediamine.

In the case that the barrier layer is made of PPA, the multi-layer tubular structure (MLT), defined above, advantageously comprises from the exterior to the interior:

layer (1)//layer (2)//PPA//layer (2')//layer (1'),     (X)

layer (1') being as defined for layer (1), layer (2') being as defined for layer (2).

In a first variant, layer (1') and layer (1) are identical and layer (2') and layer (2) are identical:

layer (1)//layer (2)//PPA//layer (2)//layer (1)     (XI).

In a second variant, layer (1') and layer (1) are identical and layer (2') and layer (2) are different:

layer (1)//layer (2)//PPA//layer (2')//layer (1)     (XII).

In a third variant, layer (1') and layer (1) are different and layer (2') and layer (2) are identical:

layer (1)//layer (2)//PPA//layer (2)//layer (1')     (XIII)

In a fourth variant, layer (1') and layer (1) are different and layer (2') and layer (2) are different:

layer (1)//layer (2)//PPA//layer (2')//layer (1')     (XIV).

The MLT structures according to the invention can be obtained by the techniques that are known for a person skilled in the art and notably by extrusion.

The invention will now be illustrated by examples without being in any way limited to these.

EXAMPLES

Compositions of the Invention Used to Manufacture the Tubes:

HT=coPA 11/10T 0.7/1.1 molar (Tm 260° C., MFI 300-5=2)+30% EPR1+0.4% stab CuI/KI at ⅛.

HTX=coPA 11/10T 0.7/1.1 molar (Tm 260° C., MFI 300-5=2)+18% EPR1+0.4% stab CuI/KI at ⅛+5% PA6 (MFI 235-5=6) +5% PA12 (MFI 235-5=6).

HT3=coPA 11/10.T 0.7/1.1 molar (Tm 260° C., MFI 300-5=2)+36% EPR1+0.4% stab CuI/KI at ⅛+10% BBSA plasticiser.

P11=PA11 (MFI 235-5=8) +6% EPR1+6% BBSA plasticiser+0.4% stab CuI/KI at ⅛.

P610-A=PA610 (MFI 235-5=4)+10% BBSA plasticiser+6% EPR1+0.4% stab CuI/KI at ⅛+5% PA6 (MFI 235-5=6)+5% PA12 (MFI 235-5=6).

PA610-B=PA610 (MFI 235-5=4)+12% BBSA plasticiser+6% EPR1+0.4% stab CuI/KI at ⅛.

P66-A=PA66 (MFI 275-5=11)+10% BBSA plasticiser+6% EPR1+0.4% stab CuI/KI at ⅛+5% PA610 (MFI 235-5=4)+5% PA12 (MFI 235-5=6).

P66-B=PA66 (MFI 275-5=11)+12% BBSA plasticiser+6% EPR1+0.4% stab CuI/KI at ⅛.

Binder (Tie)=PA610 (MFI 235-5=4)+10% BBSA plasticiser+6% EPR1+30% PA6 (MFI 235-5=6) +0.4% stab CuI/KI at ⅛

With:

EPR1 designating a copolymer of ethylene and propylene with elastomeric nature functionalized by a reactive group with anhydride function (at 0.5-1% by mass), with MFI 9 (at 230° C., below) 10 kg, of Exxellor VA1801 type from the company Exxon used as impact modifier. Its flexural modulus is about 10 MPa according to ISO standard 178:2010 (same conditions as above).

The MFI (Melt Flow Index or index of warm fluidity) is measured according to ASTM D1238.

Stab Cu designating a mixture of mineral stabilizers based on copper and potassium iodide such as Iodide P201 (BASF company), CuI and KI are in a proportion of 1 to 8.

BBSA butylbenzenesulfonamide plasticiser.

Tm meaning melting temperature (second heating of a DSC according to ISO standard 11357-3:2013).

These compositions are manufactured by conventional compounding in a co-rotating twin screw extruder of Coperion 40 type, at 300 tr/min, at 270° C. or at 300° C. when the ingredients have a melting point higher than 260° C.).

Multi-Layer Tubes of the Invention:

The multi-layer tubes are manufactured by co-extrusion.

The MLT tubes are manufactured on a conventional multi-layer tube extrusion line as described in EP2098580 or on a conventional Maillefer 60 single-layer line when they are single-layer.

The multi-layer tubes manufactured by extrusion above were then assessed according to several criteria:

flexibility;

VW impact −40° C.;

bursting in cold and heat 150° C.;

air/air thermal aging (150° C.);

Tm is the criterion chosen to characterize the suitability for being used at peak temperatures (up to about 20° C. below the Tm).

The measurement results and methods are indicated in Table I.

TABLE I

|  | structure (1) | Flexibility (2) | Impact −40° C. (3) | Bursting. 23° C. (4) | Bursting. 150° C. (4) |
|---|---|---|---|---|---|
| Examples of the invention | | | | | |
| ex. 1 | HT//P610-A//HT | 635 | 3% | 28 | 8.1 |
| ex. 2 | HT//P66-A//HT | 640 | 3% | 26.5 | 9.5 |
| ex. 3 | HTX//P66-B//HTX | 670 | 10% | 28.5 | 10.8 |
| ex. 4 | HT (300µ)//P66-A | 650 | 25% | 26.7 | 9.4 |
| ex. 5 | HT//P610-B//HT | 655 | 7% | 29.2 | 9.4 |
| Counter-examples | | | | | |
| cx. 1 | P610-A | 460 | 20% | 28.5 | 9.8 |
| cx. 2 | P66-A | 475 | 100% | 28 | nd |
| cx. 3 | P66-B | 500 | 100% | 29.5 | nd |
| cx. 4 | HT | 1110 | 10% | 29 | 5.0 |
| cx. 5 | HT3 | 555 | 10% | 17 | 3.3 |
| cx. 6 | HTX | 1275 | 0% | 40 | 6.2 |
| cx. t1 | P11//P610-A//P11 | 440 | 0% | 27.5 | 8.3 |
| cx. t2 | HTX//P11//HTX | nd | 0% | 32 | 6.9 | nd: not determined
(1) Single-layer 8*1 mm and multi-layer 8*1 mm tube, the layers of the tri-layers are distributed as follows: 0.15 mm//0.70 mm//0.15 mm
(2) Flexural modulus according to ISO 178: 2010 determined at 23° C. with relative humidity: RH50%, expressed in MPa.
(3) Impact at −40° C. according to standard VW TL-52435 §6.5, PV 3905, in breakage %.
(4) Burst at 23° C. and 150° C. according to DIN 53758, in MPa.
(5) Resistance to aging at 150° C. in air, half-life in h (corresponds to the doubt in which a breakage rate of 50% is obtained, using as criterion the DIN53758 impact at −40° C. Aging in air is sufficiently representative of aging in air (exterior of the tube)/fluid (interior of the tube)
(6) Melting temperature (according to DSC ISO standard 11357-3: 2013) in ° C. of the composition of the layer (single-layer) or of the composition of each layer (MLT). In the case of MLT tubes, the lowest among them prohibits use beyond this temperature.

What is claimed is:

1. A multilayer tubular (MLT) structure intended for transporting fluids including air, oil, water, a urea solution, a cooling liquid made from glycol, a transmission oil cooler (TOC), an air-conditioning liquid, or a fuel, petrol, bio-petrol, and diesel, comprising a least one layer (1) and at least one layer (2), said layer (1) comprising a composition comprising:

a) at least 50% by weight of at least one semi-aromatic polyamide of formula W/ZT wherein:

W is a repeating aliphatic unit selected from a unit obtained from the polycondensation of at least one $C_4$-$C_{36}$ aminocarboxylic acid, a unit obtained from the polycondensation of at least one $C_4$-$C_{36}$ lactam, and an aliphatic repeating unit X.Y obtained from the polycondensation:

of at least one diamine X, said diamine being selected from a linear or branched aliphatic diamine or a mixture thereof, and at least one dicarboxylic acid Y, said diacid being an aliphatic diacid, said diamine and said diacid comprising from 4 to 36 carbon atoms, the molar proportion of W being from 0.3 to 1.1 for 1 mole of ZT, ZT is a repeating unit obtained from the polycondensation of at least one linear or branched aliphatic diamine (Z) comprising from 9 to 18 carbon atoms, with terephthalic acid (T),
b) at least 10% by weight of an impact modifier,
c) from 0 to 20% by weight of at least one plasticiser,
d) from 0 to 40% by weight of at least one additive,
the sum a)+b)+c)+d) being equal to 100%,
said layer (2) comprising a composition comprising:
a') at least 50% by weight of at least one short-chain semi-crystalline polyamide denoted (A) constituted of at least 70% aliphatic units and having an average number of carbon atoms per nitrogen atom denoted $C_A$ ranging from 4 to 9.5, said short-chain aliphatic polyamide (A) being:
of formula $X_1Y_1/Z_1$, wherein:
$X_1Y_1$ is a repeating aliphatic unit obtained from the polycondensation of at least one linear or branched aliphatic diamine $X_1$ comprising from 2 to 6 carbon atoms, with at least one aliphatic dicarboxylic acid $Y_1$ comprising from 2 to 12 carbon atoms,
$Z_1$ is at least one optional polyamide repeating unit, $Z_1$ being present at up to 30% by weight relative to the total weight $X_1Y_1/Z_1$,
or
of formula $V/Z_1$, V being a repeating unit obtained from the polycondensation of at least one lactam comprising from 2 to 8 carbon atoms, or at least one aminocarboxylic acid comprising from 2 to 8 carbon atoms, $Z_1$ being as defined above in a'),
b') from 0 to 15% of at least one impact modifier,
c') from 0 to 12% by weight of at least one plasticiser,
d') from 0 to 40% by weight of at least one additive,
the sum a')+b')+c')+d') being equal to 100%.

2. The multilayer tubular structure (MLT) according to claim 1, wherein the semi-aromatic polyamide of layer (1) has a Tm of from 230° C. to 285° C., measured according to ISO standard 11357-3:2013.

3. The multilayer tubular structure (MLT) according to claim 1, wherein the semi-aromatic polyamide of layer (1) is selected from the group consisting of PA 11/10T, PA 12/10T, PA 1010/10T, PA 1012/10T, PA 1212/10T, PA 610/10T, PA612/10T, PA 11/12T, PA 12/12T, PA 1010/12T, PA 1012/12T, PA 1212/12T, PA 610/12T and PA612/12T.

4. The multilayer tubular structure (MLT) according to claim 1, wherein the short-chain semi-crystalline aliphatic polyamide of layer (2) is a short-chain polyamide having a Tm ≥200° C.

5. The multilayer tubular structure (MLT) according to claim 1, wherein the short-chain semi-crystalline aliphatic polyamide of layer (2) has a crystallization enthalpy ≥25 J/g, measured according to ISO standard 11357-3:2013.

6. The multilayer tubular structure (MLT) according to claim 1, wherein the short-chain semi-crystalline aliphatic polyamide of layer (2) is selected from the group consisting of PA610, PA 66, PA 6, PA 46, PA 510, PA 410, PA 612, PA 66/6 and PA 6/12 with less than 20% of co-monomer 6 and 12 respectively.

7. The multilayer tubular structure (MLT) according to claim 1, wherein the composition of said layer (2) comprises at least one PA6, PA66 or one PA6/66 or a mixture thereof and at least one PA 6Y, Y being an aliphatic dicarboxylic acid comprising from 9 to 14 carbon atoms, the mean of the average number of carbon atoms per nitrogen atom being from 4 to 9.5.

8. The multilayer tubular structure (MLT) according to claim 1, wherein layer(s) (2) has/have a thickness greater than or equal to 2 times the thickness of layer(s) (1).

9. The multilayer tubular structure (MLT) according to claim 1, wherein the proportion of impact modifier b) of layer (1) is greater than or equal to 1.5 times the proportion of impact modifier b') of layer (2).

10. The multilayer tubular structure (MLT) according to claim 9, wherein the proportion of impact modifier b') of layer (2) is less than 12% by weight.

11. The multilayer tubular structure (MLT) according to claim 1, wherein the proportion of $Z_1$ is equal to 0.

12. The multilayer tubular structure (MLT) according to claim 1, wherein said structure comprises from the exterior to the interior at least one layer (1) and at least one layer (2).

13. The multilayer tubular structure (MLT) according to claim 12, wherein a layer of binder is present between layer (1) and layer (2).

14. The multilayer tubular structure (MLT) according to claim 12, wherein layer (1) and layer (2) are directly in contact with each other.

15. The multilayer tubular structure (MLT) according to claim 1, wherein a layer (1') is present below layer (2), layer (1') being as defined for layer (1).

16. The multilayer tubular structure (MLT) according to claim 15, wherein layer (1') and layer (1) are identical.

17. The multilayer tubular structure (MLT) according to claim 1, wherein said composition of said layer (2) further comprises at least one aliphatic polyamide selected from among:
one polyamide denoted A and an average number of carbon atoms per nitrogen atom denoted $C_A$ ranging from 4 to 9.5,
one polyamide denoted B and an average number of carbon atoms per nitrogen atom denoted $C_B$ of between 7 to 10,
one polyamide denoted C having an average number of carbon atoms per nitrogen atom denoted $C_C$ of between 9 to 18;
on condition that when said interior layer (2) comprises at least three polyamides, at least one of said polyamides B or C is excluded.

18. The multilayer tubular structure (MLT) according to claim 17, wherein the short-chain semi-crystalline aliphatic polyamide of layer (2) is in proportion by weight greater than 70%, relative to the sum of the polyamides present in the composition of layer (2).

19. The multilayer tubular structure (MLT) according to claim 1, wherein said composition of said layer (2) mainly comprises:
at least said short-chain semi-crystalline aliphatic polyamide denoted (A) constituted by at least 70% of aliphatic units having an average number of carbon atoms per nitrogen atom denoted $C_A$ ranging from 4 to 8.5, and the remainder to 100% of aliphatic units constituted of at least one unit denoted B having an average number of carbon atoms per nitrogen atom denoted $C_B$ ranging from 7 to 10, and of at least one unit denoted C having an average number of carbon atoms per nitrogen atom denoted $C_C$ ranging from 9 to 18;
the average number of carbon atoms per nitrogen atom in units A, B and C further satisfying the following strict inequation: $C_A < C_B < C_C$, and the mean of the average number of carbon atoms per nitrogen atom in units A, B and C being 4 to 8.5, the enthalpy of fusion of the short-chain polyamide or the mass-weighted average of the enthalpies of fusion of the mixture of short-chain semi-crystalline aliphatic polyamides within said composition being greater than 25 J/g (DSC), the melting temperature of the polyamide or of each of the polyamides being greater than or equal to 200° C.

20. The multilayer tubular structure (MLT) according to claim 1, wherein said composition of said layer (2) mainly comprises:
- at least said short-chain semi-crystalline aliphatic polyamide denoted (A) constituted by at least 70% of aliphatic units having an average number of carbon atoms per nitrogen atom denoted $C_A$ ranging from 4 to 8.5, and the remainder to 100% of aliphatic units constituted of at least one unit denoted B having an average number of carbon atoms per nitrogen atom denoted $C_B$ ranging from 7 to 10, and
- at least said short-chain semi-crystalline aliphatic polyamide denoted (A) constituted by at least 70% of aliphatic units having an average number of carbon atoms per nitrogen atom denoted $C_A$ ranging from 4 to 8.5, and the remainder to 100% of aliphatic units constituted of at least one unit denoted C having an average number of carbon atoms per nitrogen atom denoted $C_C$ ranging from 9 to 18,
- the average number of carbon atoms per nitrogen atom in units A, B and C further satisfying the following strict inequation: $C_A<C_B<C_C$, and the mean of the average number of carbon atoms per nitrogen atom in units A, B and C being 4 to 8.5,
- the enthalpy of fusion of the short-chain polyamide or the mass-weighted average of the enthalpies of fusion of the mixture of short-chain semi-crystalline aliphatic polyamides within said composition being greater than 25 J/g (DSC),
- the melting temperature of the polyamide or of each of the polyamides being greater than or equal to 200° C.

21. The multi-layer tubular structure (MLT) according to claim 19, wherein said aliphatic unit represents from 80% to 97% by weight relative to the sum of the units present in the polyamides of the composition of layer (2).

22. The multilayer tubular structure (MLT) according to claim 1, further comprising an EVOH barrier layer.

23. The multilayer tubular structure (MLT) according to claim 22, wherein said structure comprises from the exterior to the interior:

layer (1)//layer (2)// EVOH//layer (2')//layer (1')    (V), layer (1') being as defined for layer (1), layer (2') being as defined for layer (2).

24. The multilayer tubular structure (MLT) according to claim 23, wherein layer (1') and layer (1) are identical and layer (2') and layer (2) are identical.

25. The multilayer tubular structure (MLT) according to claim 1, wherein a semi-aromatic polyamide (PPA) barrier layer is present.

26. The multilayer tubular structure (MLT) according to claim 25, wherein the semi-aromatic polyamide is selected from a polyamide MXD6, PXD6, MXD10, PXD10, or a copolyamide $X_2T/X'_2Ar$, $X_2$ and $X'_2$ each representing, independently of each other, a linear or branched $C_6$-$C_{13}$ aliphatic diamine, notably PA 9T, PA 9T/9'T, PA10T/6T, PA6T/6I, PA6T/66.

27. The multilayer tubular structure (MLT) according to claim 25, wherein said structure comprises from the exterior to the interior:
layer (1)//layer (2)//PPA// layer (2')//layer (1'), layer (1') being as defined for layer (1), layer (2') being as defined for layer (2).

* * * * *